United States Patent [19]
Bogan

[11] Patent Number: 5,932,506
[45] Date of Patent: Aug. 3, 1999

[54] ALUMINA-SILICON CARBIDE-CARBON REFRACTORY CASTABLE CONTAINING MAGNESIUM ALUMINATE SPINEL

[76] Inventor: Jeffrey E. Bogan, 112 Kuhns La., State College, Pa. 16801

[21] Appl. No.: 09/028,265

[22] Filed: Feb. 23, 1998

[51] Int. Cl.[6] .................. C04B 35/103; C04B 35/567
[52] U.S. Cl. .................. 501/89; 501/90; 501/100; 501/101; 501/120; 501/124; 501/128
[58] Field of Search ............... 501/89, 90, 100, 501/101, 120, 124, 125, 128

[56] References Cited

U.S. PATENT DOCUMENTS

| | | | |
|---|---|---|---|
| 2,559,343 | 7/1951 | Caton | 106/44 |
| 3,753,744 | 8/1973 | Komaru et al. | 106/56 |
| 3,992,214 | 11/1976 | Petrak et al. | 501/89 |
| 4,125,407 | 11/1978 | Ueno | 106/57 |
| 4,751,204 | 6/1988 | Kyoden et al. | 501/89 |
| 4,830,992 | 5/1989 | Ichikawa et al. | 501/100 |
| 4,990,475 | 2/1991 | Matsumoto et al. | 501/120 |
| 5,147,830 | 9/1992 | Banerjee et al. | 501/89 |
| 5,147,834 | 9/1992 | Banerjee | 501/89 |
| 5,214,010 | 5/1993 | Whittemore | 501/105 |
| 5,246,897 | 9/1993 | Ono et al. | 501/101 |
| 5,316,571 | 5/1994 | Yamamura et al. | 106/692 |
| 5,494,267 | 2/1996 | Anderson et al. | 501/103 |
| 5,506,181 | 4/1996 | Matsumoto et al. | 501/120 |
| 5,512,523 | 4/1996 | Ono et al. | 501/127 |

*Primary Examiner*—Michael Marcheschi
*Attorney, Agent, or Firm*—Mark Kusner

[57] ABSTRACT

A refractory castable comprised of:
   about 45% to about 75% by weight high alumina grain;
   about 2% to about 35% by weight silicon carbide;
   about 1% to about 8% by weight carbon;
   about 1% to about 8% by weight calcium aluminate cement; and
   about 1% to about 10% by weight fine magnesium aluminate spinel,
the spinel having a grain size of less than about 150 $\mu$m (100 Tyler mesh) and being comprised of about 10% to about 33% by weight magnesium oxide (MgO) and about 67% to about 90% by weight alumina ($Al_2O_3$).

7 Claims, No Drawings

ALUMINA-SILICON CARBIDE-CARBON REFRACTORY CASTABLE CONTAINING MAGNESIUM ALUMINATE SPINEL

FIELD OF THE INVENTION

The present invention relates generally to refractory castables, and more particularly to refractory materials conventionally referred to as "trough" castables.

BACKGROUND OF THE INVENTION

"Trough castable" is a term generally used to define refractory castable materials used in the iron-making industry. Trough castables are typically used in blast furnace cast house troughs and runners, tilting spouts, torpedo ladle cars, iron transfer ladles, iron mixers, cupolas and induction furnaces. In this wide range of applications, trough castables are exposed to many wear mechanisms that during normal operation will cause the refractory castable to corrode and erode away. Some of these wear mechanisms include thermal shock, iron erosion and slag corrosion.

Thermal shock relates to sudden and rapid changes in the temperature of a trough castable that may cause stresses to develop within the refractory material. These stresses can reduce the service life of the refractory lining through cracking and spalling. Iron erosion is caused by flowing molten metal mechanically eroding the exposed surface of the refractory castable. Molten iron may also attack the constituents such as silica and other oxides within the castable, and deteriorate the refractory properties of the material. Slag attacks the trough castable by forming lower temperature melting phases through various chemical reactions which makes the castable more susceptible to wear.

Basically, trough castables are designed to resist these different wear mechanisms through the use of specific types of raw materials in the formulation of the trough castable. In this respect, trough castables are typically comprised of alumina-silicon carbide-carbon ($Al_2O_3$—SiC—C). High alumina aggregate (such as fused alumina, sintered alumina or calcined bauxite) is the primary constituent in blast furnace trough castables. The high alumina aggregate has high density and low porosity to provide good resistance to metal and slag attack. The silicon carbide in the trough castable resists attack from slag, and helps protect the carbon within the trough castable from oxidizing. In addition, the silicon carbide acts as a volume stabilizer to minimize linear change when in service, and increases the thermal conductivity of the refractory material. The volume stability and higher conductivity characteristics of the silicon carbide help minimize damage from thermal shock. Carbon is added as a non-wetting compound to prevent adhesion of iron and slag to the castable. Carbon also increases the thermal conductivity of the castable.

In addition to the alumina, silicon carbide and carbon, trough castables include calcium aluminate cement. Low levels of calcium aluminate cement are used to minimize reaction between the calcium aluminate within the cement and slag. Fine aluminas and silicas are also typically added to trough castables to help promote good flow properties, corrosion resistance and hot strengths. Metals, such as silicon or aluminum, may also be added as antioxidants to protect the carbon, to aid in dry-out and to enhance the hot strength of the refractory material.

The present invention relates to an improved trough castable having increased resistance to furnace and cupolas slag through the use of fine magnesium aluminate spinel.

SUMMARY OF THE INVENTION

In accordance with the present invention, there is provided a refractory castable comprised of:

about 45% to 75% by weight high alumina grain;

about 2% to 35% by weight silicon carbide;

about 1% to 8% by weight carbon;

about 1% to 8% by weight calcium aluminate cement; and about 1% to 10% by weight fine magnesium aluminate spinel.

In accordance with another aspect of the present invention, there is provided a refractory castable comprised of:

high alumina grain having a grain size of about 6.7 mm (−3 Tyler mesh) to −45 μm (−325 Tyler mesh);

silicon carbide having a grain size of about 75 μm (−200 Tyler mesh); carbon;

calcium aluminate cement; and magnesium aluminate spinel, said spinel having a grain size less than 150 μm (100 Tyler mesh) and being comprised of about 10% to 33% by weight magnesium oxide (MgO) and about 67% to 90% by weight alumina ($Al_2O_3$).

It is an object of the present invention to provide an alumina-silicon carbide-carbon ($Al_2O_3$—SiC—C) refractory material for use as a blast furnace trough castable or trough castable.

Another object of the present invention is to provide a refractory material as described above having improved resistance to blast furnace slag, induction furnace slag and cupola slag.

Another object of the present invention is to provide a refractory material as described above that includes fine magnesium aluminate spinel.

These and other objects and advantages will become apparent from the following description of preferred embodiments.

DETAILED DESCRIPTION OF PREFERRED EMBODIMENT

The present invention relates to a refractory material used as a trough castable, and more specifically, to an improved alumina-silicon carbide-carbon ($Al_2O_3$—SiC—C), low-moisture, low-cement refractory material having improved corrosion resistance to induction furnace and blast furnace slag. In accordance with the present invention, the refractory material is preferably comprised of about 45% to about 75% by weight of high alumina grain. As used herein the term "high alumina" refers to alumina materials having an alumina content of 50% or greater. The alumina grain may include particles of varying size, but the size of the largest particles is preferably less than 6.7 mm (3 Tyler mesh). Throughout the specification, particle sizes are set forth in Tyler mesh sizes, wherein, by way of example, the legend "−8+14 mesh" means a particle sized less than 8 Tyler mesh, but greater than 14 Tyler mesh, and the legend "−325 mesh" means a particle sized less than 325 Tyler mesh.

Silicon carbide is preferably present in the refractory material in amounts ranging from about 2% to about 35% by weight. The silicon carbide preferably has a typical particle size less than 3.35 mm (6 Tyler mesh), more preferably less than 150 μm (100 Tyler mesh) and most preferably less than 75 μm (200 Tyler mesh).

Carbon is preferably present in the refractory material in amounts ranging from about 1% by weight to 8% by weight.

Calcium aluminate cement is preferably present in the refractory material in amounts ranging from about 1% to about 8%, and more preferably about 4% to about 6% by weight.

In addition to the basic components of the refractory material, i.e., the alumina, the silicon carbide and the carbon, the refractory material may also contain metals, such as silicon or aluminum, that are added as antioxidants to protect the carbon, to aid in dry-out and to enhance the hot strength of the refractory material. Likewise, dispersants and retarders may be added to the refractory material.

The improved corrosion resistance of the trough castable material is through the addition of fine spinel grains to an alumina-silicon carbide-carbon refractory material. As used herein, spinel shall refer to a group of similar multiple oxides having the same general formula and crystalline structure. As used herein, the spinel may be represented by the general formula $AB_2O_4$, wherein A represents a bivalent metal selected from the group consisting of: magnesium (Mg), zinc (Zn), manganese (Mn), iron (Fe), nickel (Ni), cobalt (Co) and cadmium (Cd); wherein B represents trivalent metal atoms selected from the group consisting of: aluminum (Al), cobalt (Co), iron (Fe), chromium (Cr) and gallium (Ga); and O is oxygen. In accordance with a preferred embodiment of the present invention, the spinel material is magnesium aluminate ($MgAl_2O_4$).

In accordance with one aspect of the present invention, the magnesium aluminate spinel has a grain size of less than 150 micron (100 Tyler mesh), more preferably a grain size less than 45 micron, and is added to an alumina-silicon carbide-carbon refractory material.

In accordance with another aspect of the present invention, the magnesium aluminate spinel is comprised of about 10% to 33% by weight magnesium oxide (MgO) and about 67% to 90% by weight alumina ($A_2O_3$).

The invention shall be further described together with the following Examples that show the effect of fine magnesium aluminate spinel when added to an alumina-silicon carbide-carbon refractory materials. In the Examples, proportions are set forth in weight percent unless otherwise indicated.

EXAMPLE I

Five (5) trough castables are prepared having mix formulations as set forth in TABLE I. In the five refractory mixes, the weight percentages and the particle sizes of fused alumina and magnesium alumina spinel are varied, along with the weight percentage of calcined alumina, to determine the effect of magnesium aluminate spinel on the properties of the respective refractory castables. Mix 1 is a standard, conventional trough castable, marketed by North American Refractories Co., under the trade designation "D-CAST TRC-SR," and contains no magnesium aluminate spinel. The weight percentages and particle sizes of the silicon carbide, carbon, calcium aluminate cement, silicon metal, aluminum, metal dispersant and retarder in all five refractory mixes are the same.

TABLE I

| TROUGH CASTABLE FORMULATION WITH SPINEL ADDITIONS | | | | | | |
|---|---|---|---|---|---|---|
| | PARTICLE SIZE (TYLER | REFRACTORY MIX (wt %) | | | | |
| MATERIAL | MESH) | MIX 1 | MIX 2 | MIX 3 | MIX 4 | MIX 5 |
| Fused Alumina Grain | −3 + 6 | 34.85 | 34.85 | | 34.85 | 35.35 |
| Fused Alumina Grain | −6 + 14 | 15 | 15 | | | 16 |
| Fused Alumina Grain | −14 + 28 | 15 | 15 | | | |
| 90% $Al_2O_3$ Magnesium Aluminate Spinel | −3 + 6 | | | 34.85 | | |
| 90% $Al_2O_3$ Magnesium Aluminate Spinel | −8 + 14 | | | 15 | 15 | |
| 90% $Al_2O_3$ Magnesium Aluminate Spinel | −14 + 28 | | | 15 | 15 | 15 |
| 90% $Al_2O_3$ Magnesium Aluminate Spinel | −325 mesh | | | 5 | 2.5 | |
| 90% $Al_2O_3$ Magnesium Aluminate Spinel | −20 µm | | 5 | | 5 | 7.5 |
| Calcined Alumina | −325 mesh | 7.5 | 2.5 | 2.5 | | |
| Silicon Carbide | −200 mesh | 14 | 14 | 14 | 14 | 14 |
| Microsilica | | 3.5 | 3.5 | 3.5 | 3.5 | 2 |
| Carbon | | 4.25 | 4.25 | 4.25 | 4.25 | 4.25 |
| Calcium Aluminate Cement | | 4 | 4 | 4 | 4 | 4 |
| Silicon Metal | −200 mesh | 1.25 | 1.25 | 1.25 | 1.25 | 1.25 |
| Aluminum Metal | −325 mesh | 0.5 | 0.5 | 0.5 | 0.5 | 0.5 |
| Dispersant- Condensed Sulfonated Naphthalene Salt | | 0.15 | 0.15 | 0.15 | 0.15 | 0.1s |

TABLE I-continued

TROUGH CASTABLE FORMULATION WITH SPINEL ADDITIONS

| MATERIAL | PARTICLE SIZE (TYLER MESH) | REFRACTORY MIX (wt %) | | | | |
|---|---|---|---|---|---|---|
| | | MIX 1 | MIX 2 | MIX 3 | MIX 4 | MIX 5 |
| Retarder-Citric Acid | | 0.01 | 0.01 | 0.01 | 0.01 | 0.01 |
| TOTAL | | 100.01 | 100.01 | 100.01 | 100.01 | 100.01 |

The refractory mixes are prepared and cast into bricks. The corrosion resistance for each refractory mix is measured by exposing bricks formed from the refractory mix to blast furnace slag. The corrosion resistance is measured in an induction furnace by immersing the bricks in molten metal having a layer of blast furnace slag thereon. The blast furnace slag has a chemistry as set forth in TABLE II:

TABLE II

CHEMICAL ANALYSIS OF BLAST FURNACE SLAG

| | $SiO_2$ | $Al_2O_3$ | CaO | MgO | $Fe_2O_3$ | MnO | $SO_3$ |
|---|---|---|---|---|---|---|---|
| Weight (%) | 37.2 | 9.9 | 37.7 | 12.8 | 0.8 | 0.5 | 0.7 |

The slag has a basicity of 1.07. The test results of the various refractory mixes are shown in TABLE III:

TABLE III

TEST RESULTS OF TROUGH CASTABLES WITH SPINEL ADDITIONS

| | REFRACTORY MIX (wt %) | | | | |
|---|---|---|---|---|---|
| | MIX 1 | MIX 2 | MIX 3 | MIX 4 | MIX 5 |
| Water to Cast (%) | 4.2 | 4.3 | 4.8 | 4.6 | 4.6 |
| 230° F. Dried Properties | | | | | |
| Density (pcf) | 192.3 | 193.2 | 175.4 | 184.2 | 188.5 |
| Porosity (%) | 10 | 8.5 | 11.6 | 10.6 | 10.8 |
| MOR (psi) | 1950 | 1910 | 2090 | 2080 | 1940 |
| Hot MOR | | | | | |
| @ 2500° F. (psi) | 650 | 350 | 260 | 180 | 240 |
| Thermal Shock Resistance | | | | | |
| (5 cycles @ 1800° F.) | | | | | |
| Strength Loss (%) | 12 | 5 | 9 | 11 | 15 |
| Slag Corrosion | | | | | |
| (8 hours @ 2850° F. w/BF slag) | | | | | |
| Area Eroded ($in^2$) | 0.532 | 0.408 | 0.736 | 0.559 | 0.431 |
| Slag Index (Mix 1 = Standard 1.00) | 1.00 | 0.77 | 1.38 | 1.05 | 0.81 |

The test results shown in TABLE III indicate that the presence of coarse spinel in refractory mixes does not yield any benefit in corrosion resistance. In this respect, Refractory Mix 3, that contains the largest amount and coarsest spinel, has the poorest corrosion resistance (a higher slag index indicates more corrosion). Refractory Mix 4, that has a lesser amount and a less coarse spinel than Mix 3, also has poor corrosion resistance. The best corrosion resistance is exhibited by Refractory Mix 2, that contains 5% by weight of magnesium aluminate spinel having a particle size of less than 20 μm. The results show that the use of coarse spinel does not yield any benefit in corrosion resistance, whereas the use of fine magnesium aluminate spinel in relatively small percentages can improve the corrosion resistance of an alumina-silicon carbide-carbon refractory material.

The thermal shock resistance measured for each of the refractory mixes is basically similar, being within an expected range of deviations for materials of this type.

The results show also that the overall bulk density of the refractory mixes having a larger amount of coarse magnesium spinel (specifically Refractory Mixes 3 and 4) is lower. It is believed that this is due to the fact that magnesium aluminate spinel has a lower grain bulk density, and thus will reduce the overall density of a refractory material if used in large amounts therein.

Refractory Mix 2, that contains 5% by weight of a fine (−20 μm) magnesium aluminate spinel, shows improved corrosion resistance over essentially a like refractory material, i.e., Refractory Mix 1 without magnesium aluminate cement.

Additional tests show that up to 10% fine magnesium aluminate spinel can be added without negatively affecting the overall properties of a conventional trough castable. As used herein, fine spinel refers to spinel having a grain size less than 150 microns (100 Tyler mesh). Preferably, the magnesium aluminate spinel content of the refractory material is about 5% to 7.5% by weight, and a preferred grain size for the magnesium aluminate spinel is less than 45 microns.

EXAMPLE II

Refractory mixes containing different magnesium aluminate spinel having different magnesium oxide to alumina weight ratios are contrasted against the standard, conventional refractory material referred to above (i.e., North American Refractories Co. D-CAST TRC-SR), that contains no magnesium aluminate spinel. TABLE IV shows three refractory mixes for a standard trough castable. Refractory Mix 1 is the same refractory identified in TABLE I and contains no magnesium aluminate spinel. Refractory Mix 6 is a refractory material similar to Refractory Mix 4, but contains 5% by weight of a 90% alumina ($Al_2O_3$) magnesium aluminate spinel. Refractory Mix 7 is a refractory mix similar to Refractory Mix 6, but contains a 78% alumina ($Al_2O_3$) magnesium aluminate spinel instead of a 90% alumina ($Al_2O_3$) magnesium aluminate spinel.

TABLE IV

TROUGH CASTABLE WITH SPINEL ADDITIONS OF VARYING MgO TO $Al_2O_3$ RATIOS

| VALUES SHOWN ARE WEIGHT % | PARTICLE SIZE (TYLER MESH) | MIX 1 | MIX 6 | MIX 7 |
|---|---|---|---|---|
| Fused Alumina Grain | −3 + 6 | 34.85 | 34.85 | 34.85 |
| Fused Alumina Grain | −6 + 14 | 15 | 15 | 15 |
| Fused Alumina Grain | −14 + 28 | 15 | 15 | 15 |
| 90% $Al_2O_3$ Mag Aluminate Spinel | −325 mesh | | 5 | |
| 78% $Al_2O_3$ Mag Aluminate Spinel | −325 mesh | | | 5 |
| Calcined Alumina | −325 mesh | 7.5 | 2.5 | 2.5 |
| Silicon Carbide | −200 mesh | 14 | 14 | 14 |
| Microsilica | | 3.5 | 3.5 | 3.5 |
| Carbon | | 4.25 | 4.25 | 4.25 |
| Calcium Aluminate Cement | | 4 | 4 | 4 |
| Silicon Metal | −200 mesh | 1.25 | 1.25 | 1.25 |
| Aluminum Metal | −325 mesh | 0.5 | 0.5 | 0.5 |
| Dispersant - Condensed Sulfonated Naphthalene Salt | | 0.15 | 0.15 | 0.15 |
| Retarder - Citric acid | | 0.01 | 0.01 | 0.01 |
| TOTAL | | 100.01 | 100.01 | 100.01 |

Slag corrosion tests are conducted on Refractory Mixes 1, 6 and 7 in a manner previously described. The test results are set forth in TABLE V:

TABLE V

SLAG TEST RESULTS OF TROUGH CASTABLES WITH SPINEL ADDITIONS OF VARYING MgO TO $Al_2O_3$ WEIGHT RATIOS

| | MIX 1 | MIX 6 | MIX 7 |
|---|---|---|---|
| Slag Corrosion (8 hours @ 2850° F. w/Blast Furnace slag) | | | |
| Area Eroded ($in^2$) | 0.764 | 0.650 | 0.657 |
| Slag Index (Mix 1 = Standard 1.00) | 1.00 | 0.85 | 0.86 |

The results in TABLE V show that the use of either a fine 90% alumina magnesium aluminate spinel or a fine 78% alumina magnesium aluminate spinel improves the corrosion resistance of a standard blast furnace trough castable. The results of Example I and Example II also show that either a −325 mesh or −20 μm magnesium aluminate spinel when added to an alumina-silicon carbide-carbon refractory will yield improved resistance to slag attack.

It is believed that the magnesium oxide to alumina weight percent ratios within the magnesium aluminate spinel can vary. According to the present invention, the percentages of magnesium oxide and alumina in the magnesium aluminate spinel are comprised of about 10% to 33% by weight magnesium oxide (MgO) and about 67% to 90% by weight alumina ($Al_2O_3$).

EXAMPLE III

In the following Example, a trough castable refractory material having a composition different than the refractory mixes in Examples I and II is contrasted with refractory mixes of the same composition with and without magnesium aluminate spinel. Table VI shows the composition of three refractory mixes. Refractory Mix 1 and Refractory Mix 2 are the same refractories identified in TABLE I. Specifically, Refractory Mix 2 is similar to Refractory Mix 1 with the exception that 5% by weight of −20 μm magnesium aluminate spinal is added to the Refractory Mix 1 in place of a like amount of −325 mesh, calcinated alumina. Refractory Mix 8 differs from both Refractory Mixes 1 and 2 primarily in the amount of carbon therein and the presence of raw kyanite in the mix.

TABLE VI

SECOND TROUGH CASTABLE FORMULATION WITH SPINEL ADDITION

| Values Shown are Weight % | PARTICLE SIZE (TYLER MESH) | MIX 1 | MIX 2 | MIX 8 |
|---|---|---|---|---|
| Fused Alumina Grain | −3 + 6 | 34.85 | 34.85 | 34.6 |
| Fused Alumina Grain | −6 + 14 | 15 | 15 | 13.75 |
| Fused Alumina Grain | −14 + 28 | 15 | 15 | 13.75 |
| Magnesium Aluminate Spinel | −3 + 6 | | | |
| Magnesium Aluminate Spinel | −8 + 14 | | | |
| Magnesium Aluminate Spinel | −14 + 28 | | | |
| Magnesium Aluminate Spinel | −325 mesh | | | |
| Magnesium Aluminate Spinel | −20 μm | | 5 | 5 |
| Calcined Alumina | −325 mesh | 7.5 | 2.5 | 2.5 |
| Silicon Carbide | −200 mesh | 14 | 14 | 16 |
| Microsilica | | 3.5 | 3.5 | 4 |
| Carbon | | 4.25 | 4.25 | 2 |
| Calcium Aluminate Cement | | 4 | 4 | 4 |
| Raw Kyanite | −35 mesh | | | 1.25 |
| Silicon Metal | −200 mesh | 1.25 | 1.25 | 2.5 |
| Aluminum Metal | −325 mesh | 0.5 | 0.5 | 0.5 |
| Dispersant - Condensed Sulfonated Naphthalene Salt | | 0.15 | 0.15 | 0.15 |
| Retarder - Citric Acid | | 0.01 | 0.01 | 0.01 |
| TOTAL | | 100.01 | 100.01 | 100.01 |

The corrosion resistance of these refractory materials are measured in an induction furnace using either modified channel induction furnace slag or modified cupola slag. The slag chemistries are shown in TABLE VII.

TABLE VII

CHEMICAL ANALYSIS OF CHANNEL AND CUPLOA SLAGS

| Weight (%) | $SiO_2$ | $Al_2O_3$ | CaO | MgO | $Fe_2O_3$ | $TiO_2$ | MnO |
|---|---|---|---|---|---|---|---|
| Channel | 40.8 | 24.5 | 6.6 | 6.0 | 13.3 | 0.2 | 8.5 |
| Cupola | 38.3 | 6.5 | 45.6 | 0.2 | 4.6 | 0.3 | 4.1 |

The modified channel furnace slag has a basicity of 0.2 and the modified cupola slag has a basicity of 1.02.

The results of the slag tests are shown in TABLE VIII.

TABLE VIII

SLAG TEST RESULTS OF SECOND TROUGH CASTABLE WITH SPINEL ADDITION

|  | MIX 1 | MIX 2 | MIX 8 |
|---|---|---|---|
| Slag Corrosion (8 hours @ 2850° F. w/Channel Slag) | | | |
| Area Eroded (in²) | 0.048 | 0.045 | 0.030 |
| Slag Index (Mix 1 = Standard 1.00) | 1.00 | 0.94 | 0.62 |
| Slag Corrosion (8 hours @ 2850° F. w/Cupola Slag) | | | |
| Area Eroded (in²) | 0.533 | 0.501 | 0.452 |
| Slag Index (Mix 1 = Standard 1.00) | 1.00 | 0.94 | 0.85 |

The foregoing results show the use of fine magnesium aluminate spinel and the improved corrosion resistance of trough castables against the modified channel induction furnace slag and a modified cupola slag derived therefrom. The composition of the trough castable also has an effect on the slag resistance as shown in the foregoing table, but the benefit of the fine magnesium aluminate spinel is still obvious.

The foregoing Examples thus illustrate how the addition of fine magnesium aluminate spinel to an alumina-silicon carbide-carbon refractory material improves the corrosion resistance in such a refractory material.

The foregoing Examples illustrate specific embodiments of the present invention. It should be appreciated that modifications and alterations may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A refractory castable, comprised of:
   about 45% to about 75% by weight high alumina grain;
   about 2% to about 35% by weight silicon carbide;
   about 1% to about 8% by weight carbon;
   about 1% to about 8% by weight calcium aluminate cement; and
   about 1% to about 10% by weight fine magnesium aluminate spinel.

2. A refractory castable as defined in claim 1, wherein said magnesium aluminate spinel has a grain size of less than about 150 $\mu$m (100 Tyler mesh).

3. A refractory castable as defined in claim 1, wherein said fine magnesium aluminate spinel comprises about 5% to about 7.5% by weight of said refractory castable.

4. A refractory castable as defined in claim 1, further comprising about 0.01% to about 0.3% by weight dispersant.

5. A refractory castable as defined in claim 1, wherein said magnesium aluminate spinel is comprised of:
   about 2.5% to about 66% by weight of magnesium oxide (MgO); and
   about 34% to about 97.5% by weight of alumina ($Al_2O_3$).

6. A refractory castable as defined in claim 5, wherein said magnesium aluminate spinel has a grain size of less than about 150 $\mu$m (100 Tyler mesh).

7. A refractory castable, comprised of:
   about 45% to about 75% by weight high alumina grain having a grain size of about 6.7 mm (3 Tyler mesh) to about 45 $\mu$m (325 Tyler mesh);
   about 2% to about 35% by weight silicon carbide having a grain size of about 75 $\mu$m (200 Tyler mesh);
   about 1% to about 8% by weight carbon;
   about 1% to about 8% by weight calcium aluminate cement; and
   about 1% to about 10% by weight magnesium aluminate spinel, said spinel having a grain size less than about 150 $\mu$m (100 Tyler mesh) and being comprised of:
   about 10% to about 33% by weight magnesium oxide (MgO), and
   about 67% to about 90% by weight alumina ($Al_2O_3$).

* * * * *